(12) United States Patent
Mecklenburg et al.

(10) Patent No.: US 10,557,028 B2
(45) Date of Patent: Feb. 11, 2020

(54) FILLED POLYOLEFIN COMPOSITION

(71) Applicant: BASELL POLIOLEFINE ITALIA S.R.L., Milan (IT)

(72) Inventors: Thomas Mecklenburg, Butzbach (DE); Klaus Klemm, Oberelsbach (DE); Erik Hans Licht, Mainz (DE); Juergen Rohrmann, Kelkheim (DE); Paola Massari, Ferrara (IT); Mara Destro, Ferrara (IT); Marco Ciarafoni, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/463,097

(22) PCT Filed: Nov. 6, 2017

(86) PCT No.: PCT/EP2017/078348
§ 371 (c)(1),
(2) Date: May 22, 2019

(87) PCT Pub. No.: WO2018/095720
PCT Pub. Date: May 31, 2018

(65) Prior Publication Data
US 2019/0284384 A1    Sep. 19, 2019

(30) Foreign Application Priority Data
Nov. 23, 2016    (EP) .................................... 16200275

(51) Int. Cl.
*C08L 23/20*    (2006.01)
*B29C 45/00*    (2006.01)
(Continued)

(52) U.S. Cl.
CPC .......... *C08L 23/20* (2013.01); *B29C 45/0001* (2013.01); *B29C 45/0005* (2013.01);
(Continued)

(58) Field of Classification Search
CPC ...................................................... C08L 23/20
See application file for complete search history.

(56) References Cited

U.S. PATENT DOCUMENTS

2004/0220325 A1    11/2004    Kitano
2016/0137823 A1    5/2016    Kim

FOREIGN PATENT DOCUMENTS

WO    2014/033017 A1    3/2014

OTHER PUBLICATIONS

International Search Report and Written Opinion dated Jan. 26, 2018 (Jan. 26, 2018) for Corresponding PCT/EP2017/078348.

*Primary Examiner* — Larry W Thrower

(57) ABSTRACT

A polyolefin composition made from or containing:
(A) from 97.0 to 45.0 wt % of a propylene-1-hexene random copolymer,
(B) from 2.0 to 50.0 wt % of fibers, and
(Q) from 0.3 wt % to 5.0 wt % of a compatibilizer,
the sum (A)+(B)+(Q) being 100,
wherein
(i) the copolymer has a content of 1-hexene derived units ranging from 0.6 wt % to 3.0 wt % with respect to the copolymer,
(ii) the copolymer has the melt flow rate (MFR) measured according to the method ISO 1133 (230° C., 2.16 kg) ranging from 0.2 up to 40 g/10 min,
(iii) the fibers are selected from the group consisting of glass fibers, carbon fibers, metal fibers, mineral fibers, ceramic fibers, and polymer fibers.

14 Claims, 2 Drawing Sheets

Tensile creep behavior at 130°C for E1

(51) Int. Cl.
*B29K 23/00* (2006.01)
*B29L 31/30* (2006.01)
*B29L 31/34* (2006.01)

(52) U.S. Cl.
CPC ....... *B29K 2023/10* (2013.01); *B29L 2031/30* (2013.01); *B29L 2031/34* (2013.01); *C08L 2205/16* (2013.01)

Tensile creep behavior at 130°C for E1

Tensile creep behavior at 130°C for CE2

FILLED POLYOLEFIN COMPOSITION

This application is the U.S. National Phase of PCT International Application PCT/EP2017/078348, filed Nov. 6, 2017, claiming benefit of priority to European Patent Application No. 16200275.2, filed Nov. 23, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a composition made from or containing a propylene-1-hexene random copolymer having a content of 1-hexene derived units ranging from 0.6 wt % to 3.0 wt %, a compatibilizer and fibers.

BACKGROUND OF THE INVENTION

In some instances, polypropylene filled with glass fibers is used for high flexural modulus, tensile modulus, heat deflection resistance, hydrolysis resistance and resistance to impact.

In some instances, glass-fiber reinforced polypropylene is used as automotive components with a load-bearing function in the engine compartment as well as support parts for polymer body panels, washing machine and dishwasher components.

In some instances, polypropylene glass fiber reinforced materials have limited flowability and processability.

SUMMARY OF THE INVENTION

In a general embodiment, the present disclosure provides a composition made from or containing propylene-1-hexene random copolymer, glass fibers and a compatibilizer. In some embodiments, the present disclosure provides automotive and electric components. In some embodiments, the present disclosure provides a composition used in an injection process.

In some embodiments, the polyolefin composition is made from or contains:
(A) from 97.0 to 45.0 wt % of a propylene-1-hexene random copolymer, and
(B) from 2.0 to 50.0 wt % of fibers, and
(Q) from 0.3 wt % to 5.0 wt % of a compatibilizer,
the sum (A)+(B)+(Q) being 100,
wherein
(i) the copolymer has a content of 1-hexene derived units ranging from 0.6 wt % to 3.0 wt % of the copolymer,
(ii) the copolymer has a melt flow rate (MFR) measured according to the method ISO 1133 (230° C., 2.16 kg) ranging from 0.2 up to 40 g/10 min, and
(iii) the fibers are selected from the group consisting of glass fibers, carbon fibers, metal fibers, mineral fibers, ceramic fibers, and polymer fibers.

DETAILED DESCRIPTION OF THE INVENTION

Figure 1:
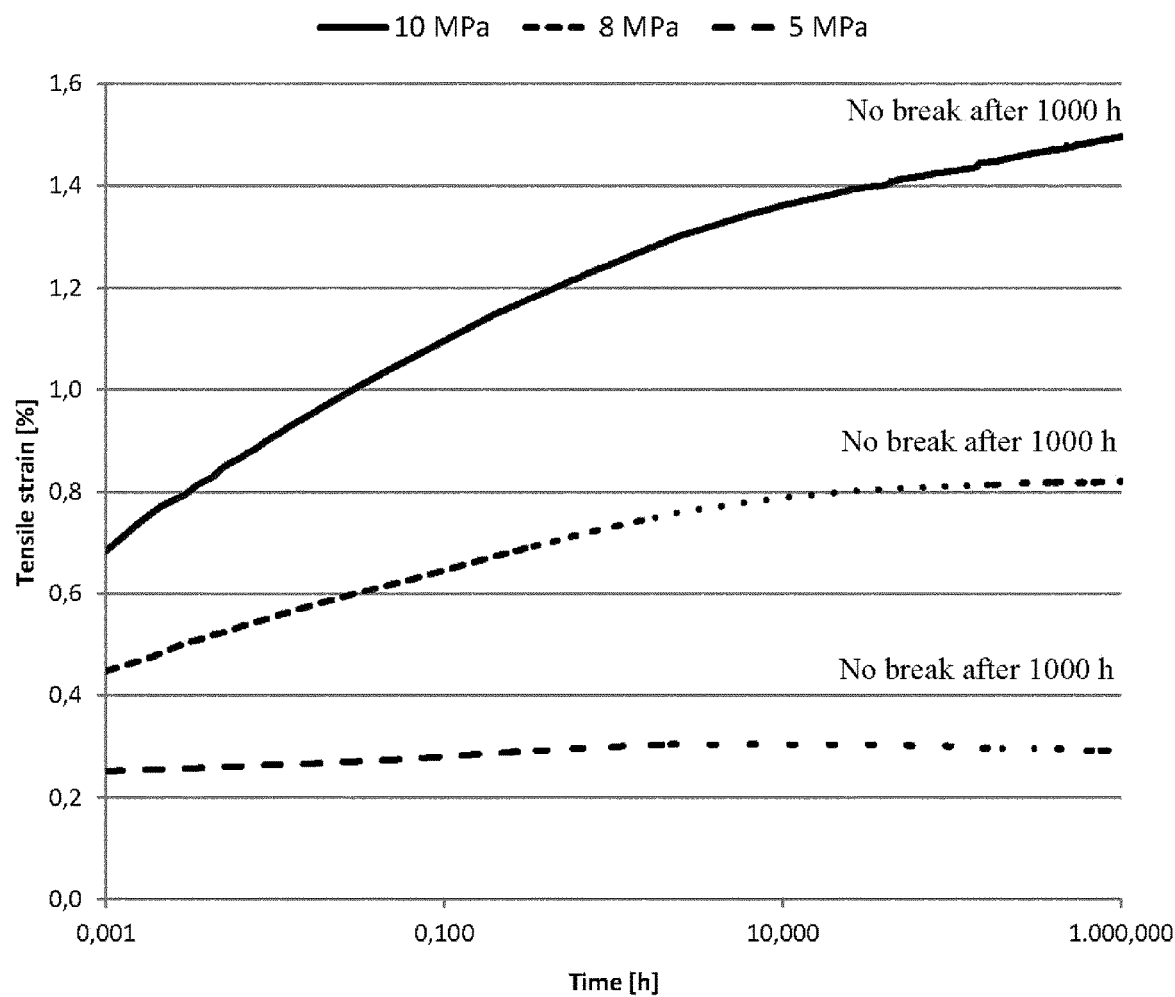
FIG. 1 provides a graph showing the tensile creep behavior at 130° C. and under different loads on an exemplary composition (E1) within the scope of the present disclosure.
Figure 2:
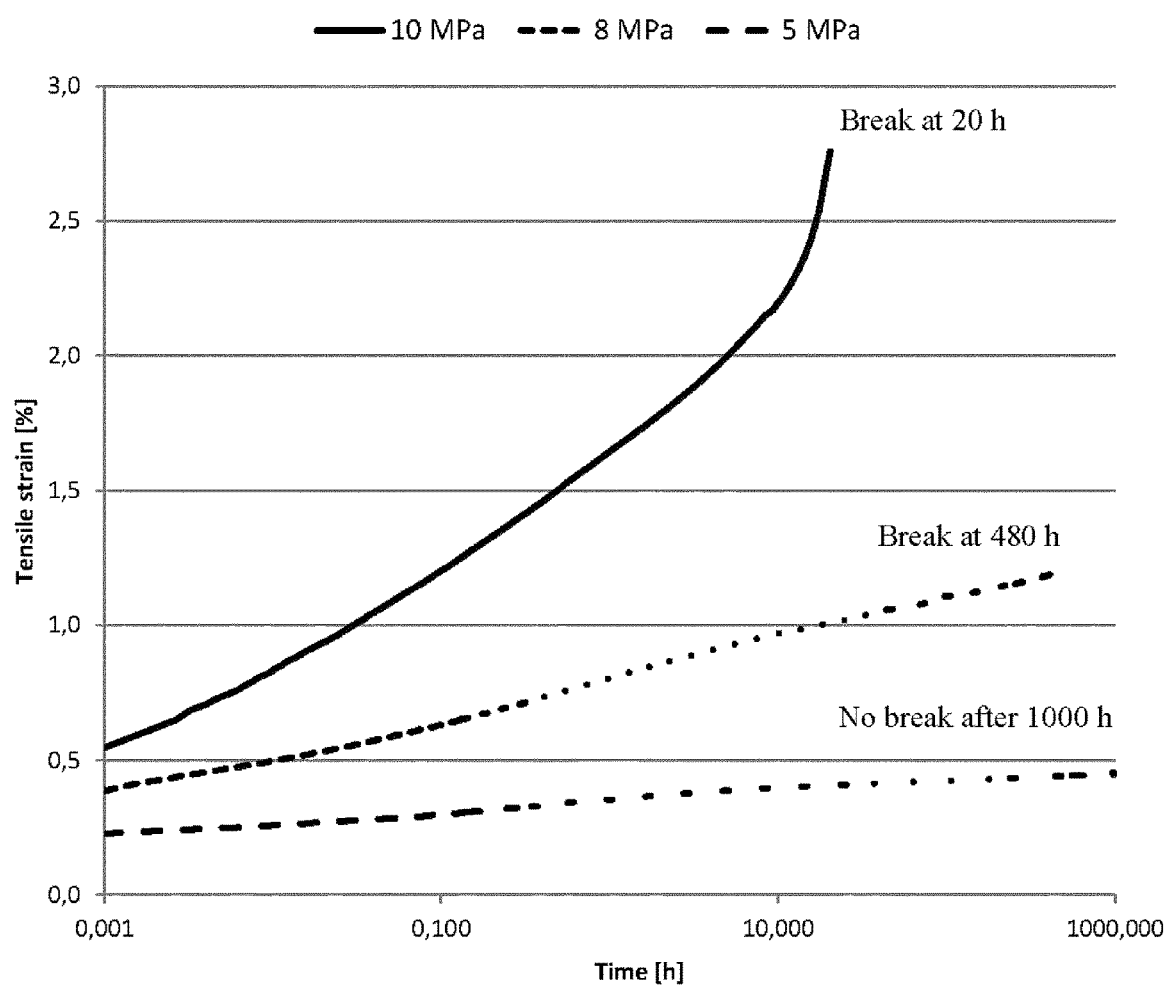
FIG. 2 provides a graph showing the tensile creep behavior at 130° C. and under different loads of a comparative example (CE2).

In some embodiments, the composition is made from or contains:
(A) from 95.0 to 50.0 wt % of a propylene-1-hexene random copolymer, and
(B) from 4.0 to 48.0 wt % of fibers,
(Q) from 0.5 to 4.0 of a compatibilizer,
alternatively
A) from 90.0 to 55.0 wt % of a propylene-1-hexene random copolymer, and
(B) from 8.0 to 45.0 wt % of fibers,
(Q) from 0.8 to 3.0 wt % of a compatibilizer,
the sum (A)+(B)+(Q) being 100.

In some embodiments, the 1-hexene derived units content ranges from 0.6 wt % to 2.0 wt %, alternatively from 0.8 wt % to 1.8 wt %, with respect to the copolymer.

In some embodiments, the melt flow rate (MFR) of the copolymer measured according to the method ISO 1133 (230° C., 2.16 kg) ranges from 0.4 g/10 min to 30 g/10 min.

In some embodiments, the melt flow rate (MFR) of the propylene-1-hexene random copolymer measured according to the method ISO 1133 (230° C., 2.16 kg) ranges from 0.2 g/10 min up to 3.0 g/10 min, alternatively from 0.3 g/10 min up to 1.5 g/10 min.

In some embodiments, (B) is present in an amount between 4.0 to 15.0 wt %, alternatively between 8.0 to 12.0 wt %, the sum (A)+(B)+(Q) being 100.

In some embodiments, the melt flow rate (MFR) of the propylene-1-hexene random copolymer measured according to the method ISO 1133 (230° C., 2.16 kg) ranges from 10.0 g/10 min up to 35.0 g/10 min, alternatively from 15.0 g/10 min up to 25.0 g/10 min.

In some embodiments, (B) is present in an amount between 20.0 to 48.0 wt %, alternatively between 25.0 to 45.0 wt %, the sum (A)+(B)+(Q) being 100.

In some embodiments, the propylene-1-hexene random copolymer is prepared by polymerization in one or more polymerization steps. In some embodiments, the polymerization is carried out in the presence of Ziegler-Natta catalysts.

In some embodiments, the polymerization stage is carried out in presence of a highly stereospecific heterogeneous Ziegler-Natta catalyst.

In some embodiments, the Ziegler-Natta catalysts are made from or contain a solid catalyst component made from or containing at least one titanium compound having at least one titanium-halogen bond and at least an electron-donor compound (internal donor), both supported on magnesium chloride. In some embodiments, the Ziegler-Natta catalysts systems are further made from or to contain an organo-aluminum compound as a co-catalyst and optionally an external electron-donor compound.

In some embodiments, the catalysts systems are described in the European Patent Nos. EP45977, EP361494, EP728769, or EP1272533 or Patent Cooperation Treaty Publication No. WO00/63261.

In some embodiments, the solid catalyst component is made from or contains Mg, Ti, halogen and an electron donor selected from esters of phthalic acids. In some embodiments, the esters of phthalic acids are as described in European Patent Application No. EP45977. In some embodiments, the esters of phthalic acids are selected from the group consisting of diisobutylphathalate, dihexylphthalate, diethylphthalate, and mixtures thereof.

In some embodiments, the solid catalyst component is by reacting a titanium compound of formula $Ti(OR)_{n-y}X_y$, where n is the valence of titanium and y is a number between 1 and n with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the spherical adducts are as described in U.S. Pat. Nos. 4,399,054 and 4,469,648. In some embodiments, the adduct is directly reacted with the Ti compound or subjected to thermal controlled dealcoholation (80-130° C.), thereby obtaining an adduct in which the number of moles of alcohol is lower than 3, alternatively between 0.1 and 2.5. In some embodiments, the reaction with the Ti compound is carried out by suspending the adduct (dealcoholated or as such) in cold $TiCl_4$. In some embodiments, the temperature of the $TiCl_4$ is 0° C. The mixture is heated up to 80-130° C. and maintained at this temperature for 0.5-2 hours. In some embodiments, the treatment with $TiCl_4$ is carried out one or more times. In some embodiments, the internal donor is added during the treatment with $TiCl_4$. In some embodiments, the treatment with the electron donor compound is repeated one or more times. In some embodiments, the internal donor is used in molar ratio with respect to the $MgCl_2$ of from 0.01 to 1, alternatively from 0.05 to 0.5. In some embodiments, the preparation of catalyst components in spherical form occurs as described in European patent application EP-A-395083 or Patent Cooperation Treaty Publication No. WO98/44001. In some embodiments, the solid catalyst components contain the titanium compound, expressed as Ti, in an amount from 0.5 to 10% by weight.

In some embodiments, the solid catalyst components show a surface area (by B.E.T. method) between 20 and 500 $m^2/g$ and, alternatively between 50 and 400 $m^2/g$, and a total porosity (by B.E.T. method) higher than 0.2 $cm^3/g$, alternatively between 0.2 and 0.6 $cm^3/g$. In some embodiments, the porosity (Hg method) due to pores with radius up to 10.000 Å ranges from 0.3 to 1.5 $cm^3/g$, alternatively from 0.45 to 1 $cm^3/g$.

In some embodiments, the organo-aluminum compound is an alkyl-Al. In some embodiments, the alkyl-Al is selected from a trialkyl aluminum compound. In some embodiments, the trialkyl aluminum compounds are selected from the group consisting of triethylaluminum, triisobutylaluminum, tri-n-butylaluminum, tri-n-hexylaluminum, and tri-n-octylaluminum. In some embodiments, the trialkylaluminum is used with alkylaluminum halides, alkylaluminum hydrides or alkylaluminum sesquichlorides. In some embodiments, the alkylaluminum sesquichlorides are selected from the group consisting of $AlEt_2Cl$ and $Al_2Et_3Cl_3$.

In some embodiments, the Al-alkyl compound is used in an amount such that the Al/Ti ratio is from 1 to 1000.

In some embodiments, the external electron-donor compounds are selected from the group consisting of silicon compounds, ethers, esters, amines, heterocyclic compounds, ketones and the 1,3-diethers. In some embodiments, the ester is ethyl 4-ethoxybenzoate. In some embodiments, the heterocylic compound is 2,2,6,6-tetramethyl piperidine.

In some embodiments, the external donor compound is selected from the group consisting of silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compound is selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1,trifluoropropyl-2-ethylpiperidinyl-dimethoxysilane and 1,1,1,trifluoropropyl-methyl-dimethoxysilane. In some embodiments, the external electron donor compound is used in an amount to provide a molar ratio between the organo-aluminum compound and the electron donor compound of from 0.1 to 500.

In some embodiments, the propylene-1-hexene polymers are prepared by using catalysts made from or containing an ester of phthalic acid as inside donor and $(cyclopentyl)_2Si(OCH_3)_2$ as outside donor.

In some embodiments, the catalysts produce polypropylene with a value of xylene insolubility at ambient temperature greater than 90 wt %, alternatively greater than 95 wt %.

In some embodiments, the process is carried out in a gas-phase polymerization reactor including at least two interconnected polymerization zones.

In some embodiments, the polymerization is described in European Patent Application No. 782 587.

In some embodiments, the process is carried out in first and second interconnected polymerization zones wherein propylene and 1-hexene are fed in the presence of a catalyst system and from which the polymer produced is discharged. In the process, the growing polymer particles flow upward through a first polymerization zone (riser) under fast fluidization conditions, leave the riser and enter a second polymerization zone (downcomer) through which the growing polymer particles flow downward in a densified form under the action of gravity, leave the downcomer and are reintroduced into the riser, thereby establishing a circulation of polymer between the riser and the downcomer.

In the downcomer, high values of density of the solid are reached, which approach the bulk density of the polymer. In some embodiments, a positive gain in pressure is obtained along the direction of flow, enabling reintroduction of the polymer into the riser without the assistance of mechanical equipment. A "loop" circulation is set up, which is defined by the balance of pressures between the two polymerization zones and the head loss introduced into the system.

In some embodiments, the condition of fast fluidization in the riser is established by feeding a gas mixture made from or containing the monomers to the riser. In some embodiments, the feeding of the gas mixture is effected below the point of reintroduction of the polymer into the riser by a gas distributor. In some embodiments, the velocity of transport gas into the riser is higher than the transport velocity under the operating conditions. In some embodiments, the velocity of the transport gas is from 2 to 15 m/s.

In some embodiments, the polymer and the gaseous mixture leaving the riser are conveyed to a solid/gas separation zone. From the separation zone, the polymer enters the downcomer. The gaseous mixture leaving the separation zone is compressed, cooled and transferred to the riser. In some embodiments, make-up monomers or molecular weight regulators are added to the gaseous mixture. In some embodiments, the transfer is carried out by a recycle line for the gaseous mixture.

In some embodiments, the control of the polymer circulation between the two polymerization zones is carried out by metering the amount of polymer leaving the downcomer. In some embodiments, the metering is controlled mechanical valves.

In some embodiments, the polymerization process occurs at a temperature between 50 to 120° C.

In some embodiments, the operating pressures are between 0.5 and 10 MPa, alternatively between 1.5 to 6 MPa.

In some embodiments, one or more inert gases are maintained in the polymerization zones in such quantities that the sum of the partial pressures of the inert gases is between 5 and 80% of the total pressure of the gases. In some embodiments, the inert gas is nitrogen or an aliphatic hydrocarbon.

The various catalysts are fed up to the riser at any point of the riser. In some embodiments, the catalysts are fed at any point of the downcomer. In some embodiments, the catalyst is in any physical state. In some embodiments, the catalysts are in a solid or a liquid state.

In some embodiments, the fibers are made of compounds selected from the group consisting of glass, carbon, metal, ceramic and organic polymers. In some embodiments, the organic polymers are selected from the group consisting of polyesters and nylons. In some embodiments, the fibers are aramids. In some embodiments, the fibers are in a filamentary form.

In some embodiments, the fibers are glass fibers.

In some embodiments, the glass fibers are milled, chopped short glass fibers, long glass fibers, or continuous filament fibers. In some embodiments, the glass fibers are chopped glass fibers. Alternatively, the chopped glass fibers are described as short glass fibers or chopped strands.

In some embodiments, the short glass fibers have a length of from 1 to 6 mm, alternatively from 3 to 4.5 mm. In some embodiments, the short glass fibers have a diameter of from 8 to 20 µm, alternatively from 10 to 14 µm.

In some embodiments and during the mixing between the propylene composition and the glass fibers, the length of the glass fibers is reduced. In some embodiments, the short glass fibers in the compound have a length of from 50 up to 2000 microns, alternatively from 300 to 600 microns.

The polypropylene compositions are made from or contain a compatibilizer as component (Q).

As used herein, the term "compatibilizer" refers to a component capable of improving the interfacial properties between mineral fillers and polymers. The compatibilizer reduces the interfacial tension between the mineral filler and the polymers while reducing the agglomeration tendency of filler particles and fibers, thereby improving dispersion of the mineral fillers and the fibers within the polymer matrix.

In some embodiments, component (Q) include low molecular weight compounds having reactive polar groups increase the polarity of the propylene-1-hexene copolymer and are believed to react with the functionalized coating or sizing of the fillers, thereby enhancing the compatibility with the polymer. In some embodiments, the fillers are functionalized with silanes. In some embodiments, the silanes are selected from the group consisting of aminosilanes, epoxysilanes, amidosilanes and acrylosilanes. In some embodiments, the silane is an aminosilane.

In some embodiments, the compatibilizers are made from or contain a polymer modified (functionalized) with polar moieties and optionally a low molecular weight compound having reactive polar groups. In some embodiments, modified olefin polymers are propylene homopolymers and copolymers. In some embodiments, modified olefin polymers are copolymers of ethylene and propylene with each other or with other alpha olefins. In some embodiments, modified olefin polymers are modified polyethylene or polybutene.

In some embodiments, the modified polymers are graft or block copolymers. In some embodiments, the modified polymers contain groups deriving from polar compounds. In some embodiments, the polar compounds are selected from the group consisting of acid anhydrides, carboxylic acids, carboxylic acid derivatives, primary and secondary amines, hydroxyl compounds, oxazoline and epoxides, and ionic compounds.

In some embodiments, the polar compounds are selected from the group consisting of unsaturated cyclic anhydrides and their aliphatic diesters, and the diacid derivatives. In some embodiments, the polar compounds are selected from the group consisting of maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid and mixtures thereof.

In some embodiments, component (Q) is used in an amount ranging from 0.3 up to 5.0 wt % with respect to the sum (A)+(B)+(Q).

In some embodiments, the amount of groups deriving from polar compounds in the modified polymers ranges from 0.3 to 3% by weight, alternatively from 0.3 to 1.5 wt %.

In some embodiments, values of MFR for the modified olefin polymers are from 5 to 500 g/10 min.

In some embodiments, the modified olefin polymer is a propylene polymer grafted with maleic anhydride.

In some embodiments, the propylene polymer grafted with maleic anhydride has a grafting level from 0.3 to 1.5 wt %.

In some embodiments, the low molecular weight compound is applied to the glass fibers before the glass fibers are incorporated into the composition.

In some embodiments, the modified polymer is produced by reactive extrusion of the olefin polymer. In some embodiments, the reactive extrusion occurs with maleic anhydride in the presence of free radical generators as described in European Patent Application No. EP0572028.

In some embodiments, a masterbatch made from or containing the fillers and the compatibilizer in a premixed form is used.

In some embodiments, the polyolefin compositions are further made from or contain from 1 up to 5 wt % with respect to the sum (A)+(B)+(Q) of a polypropylene homopolymer, the sum (A)+(B)+(Q) being 100. In some embodiments, the polyolefin compositions are further made from or contain 5 wt % with respect to the sum (A)+(B)+(Q) of a polypropylene homopolymer, the sum (A)+(B)+(Q) being 100

In some embodiments, the polyolefin compositions are prepared by melting and mixing the components at temperatures of from 180 to 310° C., alternatively from 190 to 280° C., alternatively from 200 to 250° C.

In some embodiments, the mixing apparatus is an extruder or a kneader. In some embodiment, the mixing apparatus is a twin-screw extruder. In some embodiments, the components are pre-mixed at room temperature in a mixing apparatus.

In some embodiments, the process includes initially melting components (A) and compatibilizer (Q), and subsequently mixing component (B) with the melt, thereby reducing abrasion in the mixing apparatus and fiber breakage.

In some embodiments, a masterbatch made from or containing component (B) and compatibilizer (Q) in a premixed form is used.

In some embodiments, the polyolefin compositions further include additives. In some embodiments, the additives are selected from the group consisting of stabilizing agents, nucleating agents, plasticizers, antiacids, antistatic, slip agents, and water repellant agents. In some embodiments, the stabilizing agents protect against heat, light, or U.V. In some embodiments, the slip agents are selected from the group consisting of stearates and polar waxes.

In some embodiments, the polyolefin compositions also contain a nucleating agent.

In some embodiments, the nucleating agents are selected from the group consisting of sodium 2,2-methylene-bis-(4,6, di-tert-butylphenyl) phosphate, talc, N,N'-ethylene-bis-stearamide, stearamide, dibenzylidene sorbitol and its derivatives, aluminum bis[2,2'-methylene-bis-(4,6-di-tert-butylphenyl)phosphate], phthalocyanine pigments, and compounds disclosed in Patent Cooperation Treaty Publication Nos. WO2008/064957 and WO2008/064958. In some embodiments, the dibenzylidene sorbitol derivatives are selected from the group consisting of methylbenzylidene sorbitol and 3,4-dimethylbenzylidene sorbitol.

In some embodiments, the nucleating agents are present in amounts from 0.01 to 1% by weight with respect to the total weight of the composition.

EXAMPLES

The following examples are given to illustrate the present invention without limiting purpose.

The data relating to the propylene copolymers of the examples are determined by way of the methods reported below.

Melting Temperature and Crystallization Temperature: determined by differential scanning calorimetry (DSC). A sample weighing 6±1 mg, was heated to 220±1° C. at a rate of 20° C./min and maintained at 220±1° C. for 2 minutes in nitrogen stream and thereafter cooled at a rate of 20° C./min to 40±2° C., then maintained at this temperature for 2 min to crystallize the sample. Then, the sample was again fused at a temperature rise rate of 20° C./min up to 220° C.±1. The second melting scan was recorded. A thermogram was obtained. Temperatures corresponding to peaks were read.

Melt Flow Rate: Determined according to the method ISO 1133 (230° C., 2.16 kg).

Density: ISO 1183

1-hexene content: Determined by $^{13}$C-NMR spectroscopy as follows:

NMR analysis. $^{13}$C NMR spectra were acquired on an AV-600 spectrometer operating at 150.91 MHz in the Fourier transform mode at 120° C. The peak of the propylene CH was used as an internal reference at 28.83. The $^{13}$C NMR spectrum was acquired using the following parameters:

| | |
|---|---|
| Spectral width (SW) | 60 ppm |
| Spectrum centre (O1) | 30 ppm |
| Decoupling sequence | WALTZ 65_64pl |
| Pulse program | ZGPG |
| Pulse Length (P1) | for 90° |
| Total number of points (TD) | 32K |
| Relaxation Delay | 15 s |
| Number of transients | 1500 |

The total amount of 1-hexene as molar percent was calculated from diad using the following relations:

$[P]=PP+0.5PH$ $[H]=HH+0.5PH$

Assignments of the $^{13}$C NMR spectrum of propylene-1-hexene copolymers were calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Flexural modulus (secant): determined according to ISO 178 on rectangular specimens 80×10×4 mm from T-bars ISO 527-1 Type 1A;

Tensile Modulus (secant): ISO 527/-1, -2 on specimens Type 1A with velocity of 1 mm/min, span of 50 mm;

Charpy notched: ISO 179 (type 1, edgewise, Notch A) on rectangular specimens 80×10×4 mm from T-bars ISO527-1 Type 1A;

Tensile strain at break, tensile stress at break, tensile stress at yield: ISO 527/-1, -2 on specimens Type 1A with velocity of 50 mm/min, span of 50 mm;

Tensile creep test: tensile strain vs. time was monitored according to DIN EN ISO 899-1 on specimens Type 1A at 120 or 130° C., defined permanent load in the range from 3 up to 25 MPa and a testing period of maximum 1000 h.

Vicat temperature: determined according to DIN EN ISO 306, after 24 hours (10 N load).

Tensile Stress at Break was measured after immersion of the specimens in water at 95° C. for 40 days.

T-bar preparation (injection molded): test specimens were injection-molded according to Test Method ISO 1873-2 (1989).

Example A1—Component A1

Component A1 was a propylene-1-hexene copolymer prepared by polymerizing propylene and 1-hexene in the presence of a catalyst under continuous conditions in a plant including a precontact section, a prepolymerization section and a polymerization apparatus that included two interconnected cylindrical reactors, riser and downcomer. Fast fluidization conditions were established in the riser by feeding gas recycled from the gas-solid separator.

The catalyst employed was made from or contained a catalyst component prepared by analogy with example 5 of European Patent Application No. EP-A-728769 but using microspheroidal $MgCl_2 \cdot 1.7C_2H_5OH$ instead of $MgCl_2 \cdot 2.1C_2H_5OH$. The catalyst component was mixed with dicyclopentyl dimethoxy silane (DCPMS) as external donor and triethylaluminum (TEAL) in the precontact section. The catalyst system was then subjected to prepolymerization.

The polymer particles exiting the reactor were subjected to a steam treatment to remove the reactive monomers and volatile substances and then dried. The polymer particles were extruded with stabilizers.

The main operative conditions of the polymerization process are indicated in Table 1.

In Table 2, the main properties of A1 are reported.

Example A2—Component A2

Component A2 was a propylene-1-hexene copolymer prepared as component A1 but with an hydrogen content to obtain a copolymer with MFR of 0.4 g/10 min according to the method ISO 1133 (230° C., 2.16 kg).

The main operative conditions of the polymerization process are indicated in Table 1.

In Table 2, the main properties of A2 are reported.

TABLE 1

| Example | A1 | A2 |
|---|---|---|
| PRECONTACT | | |
| Precontact Temperature [° C.] | 15 | 12 |
| Precontact Residence Time [min] | 10 | 17.5 |
| TEA/solid catalyst component [g/g] | 6 | 5 |
| TEA/DCPMS [g/g] | 4 | 4 |
| PREPOLYMERIZATION | | |
| Prepolymerization Temperature [° C.] | 20 | 30 |
| Prepolymerization Residence Time [min] | 5 | 12.2 |

TABLE 1-continued

| Example | | A1 | A2 |
|---|---|---|---|
| POLYMERIZATION | | | |
| Polymerization Temperature[° C.] | | 80 | 80 |
| Pressure (barg) | | 25 | 25 |
| $C_6/(C_3 + C_6)$ [mol/mol] | Riser | 0.007 | 0.0125 |
| $C_6/(C_3 + C_6)$ [mol/mol] | Downcomer | — | — |
| $H_2/C_3^{--}$ [mol/mol] | Riser | 0.051 | 0.003 |
| $H_2/C_3^{--}$ [mol/ppm] | Downcomer | — | 35 |

$H_2$ hydrogen;
$C_3$ propylene;
$C_6$ 1-hexene

TABLE 2

| Example | A1 | A2 |
|---|---|---|
| 1-hexene content [wt %] | 1.3 | 1.7 |
| Density [g/cm³] | 0.9 | 0.9 |
| MFR [g/10 min] | 20 | 0.4 |
| Melting Temperature [° C.] | 153 | 152 |
| Crystallization Temperature [° C.] | 105 | 106 |
| Flexural modulus [MPa] | 1518 | 1300 |
| Tensile stress at yield [MPa] | 35.4 | 33.4 |
| Elongation at yield [%] | 9.5 | 10.9 |
| Tensile stress at break [MPa] | 21.1 | 30.0 |
| Elongation at break [%] | 760 | 490 |
| Xylene-soluble content [wt %] | 1.3 | 2.5 |

Component A3 was a polypropylene homopolymer having density 0.9 g/cm³ and MFR 140 g/10 min according to the method ISO 1133 (230° C., 2.16 kg).

Component A4 was a polypropylene homopolymer having density 0.9 g/cm³ and MFR 10 g/10 min according to the method ISO 1133 (230° C., 2.16 kg).

Component A5 was a random copolymer of propylene and ethylene having ethylene derived units content of 1.3 wt % with respect to the copolymer, density 0.9 g/cm³ and MFR 25 g/10 min according to the method ISO 1133 (230° C., 2.16 kg).

Component A6 was a polypropylene homopolymer having density 0.9 g/cm³ and MFR 0.4 g/10 min according to the method ISO 1133 (230° C., 2.16 kg).

| Examples | E1* | E2** | CE1** | CE2* | CE3* | E3*** | CE4*** |
|---|---|---|---|---|---|---|---|
| Component (A) | A1 | A1 | A3 | A4 | A5 | A2 | A6 |
| (A) wt % ((A) + (B) + (Q) = 100) | 68.2 | 56.0 | 56.0 | 68.2 | 68.2 | 89.0 | 89.0 |
| (B) wt % ((A) + (B) + (Q) = 100) | 30.3 | 41.4 | 41.4 | 30.3 | 30.3 | 10.2 | 10.2 |
| (Q) wt % ((A) + (B) + (Q) = 100) | 1.5 | 2.6 | 2.6 | 1.5 | 1.5 | 0.8 | 0.8 |
| Melt flow rate of (A) [g/10 min] | 20 | 20 | 140 | 10 | 25 | 0.4 | 0.4 |
| Glass fibers [wt %] | 30 | 40 | 40 | 30 | 30 | 10 | 10 |
| Comonomer | C6 | C6 | 0 | 0 | C2 | C6 | 0 |
| Comonomer content [wt %] | 1.1 | 1.1 | 0 | 0 | 1.3 | 1.3 | 0 |
| Melt volume flow rate (230/2.16) [cm³/10 min] | 6 | 5.6 | 30.8 | 3.6 | 8.3 | 0.35 | 0.6 |
| Density [g/cm³] | 1.14 | 1.21 | 1.21 | 1.14 | 1.14 | 0.98 | 0.98 |
| Tensile stress at yield [MPa] | 101.4 | 114 | 118 | 103.2 | 100.7 | 47.9 | 50.3 |
| Tensile strain at break [%] | 3.7 | 3.5 | 2.4 | 3.6 | 3.6 | 8.1 | 7.6 |
| Tensile stress at break [MPa] | 99.8 | 112 | 115 | 100.2 | 100 | 44.3 | 47.2 |
| Tensile modulus [MPa] | 6520 | 9070 | 9610 | 6660 | 6400 | 2740 | 2760 |
| Flexural modulus [MPa] | 6884 | 8800 | 9230 | 6987 | 6542 | n | n |
| Variation of tensile stress at break after hot water immersion, 95° C., 40 days [%] | −14.5 | na | na | −22.2 | na | −10.7 | −20.3 |
| Tensile creep 10 MPa [h until rupture] 130° C. | >1000 | na | na | 20 | 44 | na | na |
| Tensile creep 8 MPa [h until rupture] 130° C. | >1000 | >1000 | na | 479 | 477 | na | na |
| Tensile creep 5 MPa [h until rupture] 130° C. | >1000 | >1000 | >1000 | >1000 | >1000 | na | na |
| Tensile creep 16 MPa [h until rupture] 120° C. | na | >1000 | 12 | na | na | na | na |
| Tensile creep 5 MPa [h until rupture] 120° C. | na | na | na | na | na | >1000 | 280 |
| Charpy notched 23° C. [kJ/m²] | 12.5 | 11.2 | 8.5 | 11.9 | 12.9 | 6.8 | 10.0 |
| Charpy notched 0° C. [kJ/m²] | 10.7 | 10.2 | 8.0 | 10.6 | 10.6 | 4.3 | 5.3 |
| Charpy notched −30° C. [kJ/m²] | 9.5 | 10 | na | 9.4 | 9.8 | 3.2 | 4.3 |
| VICAT [° C.] | 135 | 138 | 137 | 136 | 131 | 105 | 108 |

Example E1

Composition of Example E1 was obtained by using A1 propylene-1-hexene copolymer as component (A), 30.3 wt % of glass fibers as component (B) and 2.5 wt % of component (Q) with respect to the sum (A)+(B)+(Q).

Component (B) was a Chopped Strand ADVANTEX DS 2200-10P (3B) with a fiber length of 4 mm and diameter of 10 μm.

Component (Q) was Exxelor PO1020 from Exxon, MFR approx.400 g/10 min (230° C., 2.16 kg), which was a polypropylene highly functionalized with maleic anhydride (grafting level in the range of 0.5-1.0 wt %).

The composition was prepared by extrusion, using a twin screw extruder, model Werner&Pfleiderer ZSK40SC. This line had a process length of 43 L/D and was provided with gravimetric feeders. Components (A) and (Q) were fed into the first barrel and component B) was fed into the fifth barrel, via forced side feeding.

The composition also contained 0.7 wt % of antioxidant additives and 0.2 wt % of erucamide, with respect to the sum (A)+(B)+(Q).

A strand die plate with cooling bath and strand cutter Scheer SGS100 was used to form pellets. Vacuum degassing (barrel No. 8) was applied to extract fumes and decomposition products.

Running conditions:
Screw speed: 200 rpm;
Capacity: 50-60 kg/h;
Barrel Temperature: 230-250° C.

Example E2

Composition of Example E2 was obtained by using A1 as component (A), 41.4 wt % of glass fibers as component (B) and 2.6 wt % of component (Q) with respect to the sum (A)+(B)+(Q).

Components (B) and (Q) were the same as used in Example E1.

The composition contained 1.1 wt % of antioxidant additives, 0.2 wt % of erucamide and 2.1 wt % of carbon black MB PE 4687, each with respect to the sum (A)+(B)+(Q).

The composition was prepared by extrusion using a twin screw extruder in the same conditions used for Example E1.

Example E3

Composition of Example E3 was obtained in the same conditions of Example E1 by using A2 as component (A), 10.2 wt % of glass fibers as component (B) and 2.5 wt % of component (Q) with respect to the sum (A)+(B)+(Q).

Components (B) and (Q) were the same as used in Example E1.

The composition contained 0.9 wt % of antioxidant additives and 1.4 wt % of carbon black MB PE 4687, both with respect to the sum (A)+(B)+(Q).

The composition was prepared by extrusion using a twin screw extruder in the same conditions used for Example E1.

Example CE1

Composition of Example CE1 was obtained in the same conditions of Example E1 by using A3 as component (A), 40 wt % of glass fibers as component (B) and 0.8 wt % of component (Q) with respect to the sum (A)+(B)+(Q).

Components (B) and (Q) were the same as used in Example E1.

The composition contained 1.1 wt % of antioxidant additives, 0.2 wt % of erucamide and 2.1 wt % of carbon black MB PE 4687, each with respect to the sum (A)+(B)+(Q).

The composition was prepared by extrusion using a twin screw extruder in the same conditions used for Example E1.

Example CE2

Composition of Example CE2 was obtained in the same conditions of Example E1 by using A4 as component (A), 30 wt % of glass fibers as component (B) and 0.8 wt % of component (Q) with respect to the sum (A)+(B)+(Q).

Components (B) and (Q) were the same as used in Example E1.

The composition contained 0.7 wt % of antioxidant additives and 0.2 wt % of erucamide, both with respect to the sum (A)+(B)+(Q).

The composition was prepared by extrusion using a twin screw extruder in the same conditions used for Example E1.

Example CE3

Composition of Example CE3 was obtained in the same conditions of Example E1 by using A5 as component (A), 10 wt % of glass fibers as component (B) and 0.8 wt % of component (Q) with respect to the sum (A)+(B)+(Q).

Components (B) and (Q) were the same as used in Example E1.

The composition contained 0.7 wt % of antioxidant additives and 0.2 wt % of erucamide, both with respect to the sum (A)+(B)+(Q).

The composition was prepared by extrusion using a twin screw extruder in the same conditions used for Example E1.

Example CE4

Composition of Example CE4 was obtained in the same conditions of Example E1 by using A6 as component (A), 10 wt % of glass fibers as component (B) and 0.8 wt % of component (Q) with respect to the sum (A)+(B)+(Q).

Components (B) and (Q) were the same as used in Example E1.

The composition contained 0.9 wt % of antioxidant additives and 1.4 wt % of carbon black MB PE 4687, both with respect to the sum (A)+(B)+(Q).

The composition was prepared by extrusion using a twin screw extruder in the same conditions used for Example E1.

What is claimed is:
1. A polyolefin composition comprising:
   (A) from 97.0 to 45.0 wt % of a propylene-1-hexene random copolymer,
   (B) from 2.0 to 50.0 wt % of fibers, and
   (Q) from 0.3 wt % to 5.0 wt % of a compatibilizer,
   the sum (A)+(B)+(Q) being 100,
   wherein
   (i) the copolymer has a content of 1-hexene derived units ranging from 0.6 wt % to 3.0 wt % with respect to the copolymer,
   (ii) the copolymer has the melt flow rate (MFR) measured according to the method ISO 1133 (230° C., 2.16 kg) ranging from 0.2 up to 40 g/10min,
   (iii) the fibers are selected from the group consisting of glass fibers, carbon fibers, metal fibers, mineral fibers and ceramic fibers.

2. The polyolefin composition according to claim 1, wherein the compatibilizer (Q) is a propylene polymer grafted with maleic anhydride with grafting level from 0.3 to 1.5 wt %.

3. The polyolefin composition according to claim 1, wherein the fibers are glass fibers.

4. The polyolefin composition according to claim 1 further comprising:
   5 wt % with respect to the sum (A)+(B)+(Q) of a polypropylene homopolymer.

5. The polyolefin composition according to claim 1, wherein the content of 1-hexene derived units ranges from 0.6 wt % to 2.0 wt % with respect to the copolymer.

6. The polyolefin composition according to claim 5, wherein the content of 1-hexene derived units ranges from 0.8 wt % to 1.8 wt % with respect to the copolymer.

7. The polyolefin composition according to claim 1, wherein (A) is from 95.0 to 50.0 wt %, (B) is from 4.0 to 48.0 wt % and (Q) is from 0.5 to 4.0 wt %, the sum (A)+(B)+(Q) being 100.

8. The polyolefin composition according to claim 1, wherein the melt flow rate (MFR) of the copolymer measured according to the method ISO 1133 (230° C., 2.16 kg) ranges from 0.4 g/10min to 30 g/10min.

9. The polyolefin composition according to claim 1, wherein the melt flow rate (MFR) of the copolymer measured according to the method ISO 1133 (230° C., 2.16 kg) ranges from 0.2 g/10 min to 3.0 g/10min.

10. The polyolefin composition according to claim 9, wherein (B) is between 4.0 to 15.0 wt %, the sum (A)+(B)+(Q) being 100.

11. The polyolefin composition according to claim 8, wherein the melt flow rate (MFR) of the copolymer measured according to the method ISO 1133 (230° C., 2.16 kg) ranges from 10.0 g/10 min to 35.0 g/10 min.

12. The polyolefin composition according to claim 11, wherein (B) is between 20.0 to 48.0 wt %, the sum (A)+(B)+(Q) being 100.

13. An article of manufacture comprising the composition according to claim 1, wherein the article is an automotive or an electric component.

14. A process for preparing an article of manufacture comprising the step of:
   injection molding the composition according to claim 1, wherein the article is an automotive, electronic, or electric component.

* * * * *

UNITED STATES PATENT AND TRADEMARK OFFICE
CERTIFICATE OF CORRECTION

PATENT NO. : 10,557,028 B2
APPLICATION NO. : 16/463097
DATED : February 11, 2020
INVENTOR(S) : Mecklenburg et al.

It is certified that error appears in the above-identified patent and that said Letters Patent is hereby corrected as shown below:

On the Title Page

Column 1, Item (30), Line 1, delete "16200275" and insert -- 16200275.2 --, therefor In the Specification In Column 1, Line 29, delete "machine" and insert -- machines --, therefor
In Column 2, Line 66, delete "diisobutylphathalate," and insert -- diisobutyl phthalate, --, therefor
In Column 3, Line 67, delete "heterocylic" and insert -- heterocyclic --, therefor
In Column 6, Line 54, after "100" insert -- . --
In Column 6, Line 61, delete "twin-screw" and insert -- twin screw --, therefor
In Column 11, Line 15, delete "ZSK4OSC." and insert -- ZSK40SC. --, therefor In the Claims In Column 13, Claim 4, Line 7, after "Claim 1" insert -- , --

Signed and Sealed this
Third Day of January, 2023

Katherine Kelly Vidal
*Director of the United States Patent and Trademark Office*